(12) United States Patent
Salhotra et al.

(10) Patent No.: US 8,369,469 B1
(45) Date of Patent: Feb. 5, 2013

(54) ROBUST SYNCHRONIZATION AND DETECTION MECHANISMS FOR OFDM WLAN SYSTEMS

(75) Inventors: Atul Salhotra, Santa Clara, CA (US); Kedar Shirali, San Jose, CA (US); Zhiyu Yang, Cupertino, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 10 days.

(21) Appl. No.: 13/085,350

(22) Filed: Apr. 12, 2011

Related U.S. Application Data

(63) Continuation of application No. 11/642,442, filed on Dec. 20, 2006, now Pat. No. 7,924,930.

(60) Provisional application No. 60/773,591, filed on Feb. 15, 2006, provisional application No. 60/776,102, filed on Feb. 23, 2006.

(51) Int. Cl.
*H04L 25/08* (2006.01)

(52) U.S. Cl. ......... 375/347; 375/346; 455/132; 455/296

(58) Field of Classification Search ................... 375/347
See application file for complete search history.

(56) References Cited

U.S. PATENT DOCUMENTS

| | | | |
|---|---|---|---|
| 6,507,605 B1* | 1/2003 | Fukumoto et al. | ............. 375/152 |
| 7,430,257 B1 | 9/2008 | Shattil | |
| 7,631,029 B2 | 12/2009 | Marsili | |
| 7,821,976 B2* | 10/2010 | Kim et al. | ....................... 370/311 |
| 2003/0123530 A1* | 7/2003 | Maeda et al. | ................. 375/148 |
| 2003/0236081 A1 | 12/2003 | Braun | |
| 2004/0019492 A1 | 1/2004 | Tucker et al. | |
| 2004/0116112 A1* | 6/2004 | Gray | ............................. 455/423 |
| 2005/0128985 A1 | 6/2005 | Liberti et al. | |
| 2005/0141630 A1 | 6/2005 | Catreux et al. | |
| 2005/0163264 A1* | 7/2005 | Nakao et al. | ................... 375/343 |
| 2005/0185699 A1 | 8/2005 | Feher | |
| 2006/0025178 A1 | 2/2006 | Tao et al. | |
| 2006/0166634 A1* | 7/2006 | Ido | .............................. 455/277.1 |
| 2007/0060155 A1 | 3/2007 | Kahana et al. | ................. 455/450 |
| 2007/0153881 A1* | 7/2007 | Arslan | ........................... 375/150 |
| 2008/0144596 A1 | 6/2008 | Dankberg et al. | |
| 2010/0172427 A1* | 7/2010 | Kleider et al. | ................. 375/260 |
| 2012/0106665 A1* | 5/2012 | Nakao | ........................... 375/260 |

OTHER PUBLICATIONS 802.11n; IEEE P802.11-04/0889r6; Wireless LANs, TGn Sync Proposal Technical Specification; 131 pages.
IEEE Std 802.16/2004 (Revision of IEEE Std 802.16/2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

(Continued)

*Primary Examiner* — Erin File

(57) ABSTRACT

A method including: receiving, through a wireless channel, a plurality of modulated signals at a plurality of antennas, wherein each antenna receives a corresponding modulated signal; generating a plurality of autocorrelated signals by autocorrelating the plurality of modulated signals; determining whether a signal strength associated with each modulated signal is (i) below a threshold or (ii) above the threshold; for each modulated signal having a signal strength below the threshold, disabling the antenna that received the modulated signal having the signal strength below the threshold; combining the modulated signals having a signal strength above the threshold; generating weighted autocorrelated signals based on (i) the plurality of autocorrelated signals and (ii) the combined modulated signals; generating a combined weighted signal by summing the weighted autocorrelation signals; demodulating the combined weighted signal; and determining a state of the wireless channel based on the demodulation of the combined weighted signal.

12 Claims, 16 Drawing Sheets

OTHER PUBLICATIONS

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11g/D2.8, May 2002 (Supplement to ANSI/IEEE Std 802.11, 1999 Edition) DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band; LAN/MAN Standards Committee of the IEEE Computer Society; 53 pages.

* cited by examiner

ROBUST SYNCHRONIZATION AND DETECTION MECHANISMS FOR OFDM WLAN SYSTEMS

CROSS-REFERENCE TO RELATED APPLICATIONS

This application is a continuation of U.S. application Ser. No. 11/642,442 (now U.S. Pat. No. 7,924,930), filed on Dec. 20, 2006, which claims the benefit of: U.S. Provisional Application No. 60/773,591, filed on Feb. 15, 2006, and U.S. Provisional Application No. 60/776,102, filed on Feb. 23, 2006. The disclosures of the applications referenced above are incorporated herein by reference.

FIELD

The present disclosure relates to synchronization and detection mechanisms for orthogonal frequency-division multiplexing (OFDM) receivers in wireless local area network (WLAN) systems.

BACKGROUND

In OFDM WLAN systems, such as those specified by IEEE Standards 802.11a, 802.11g, 802.11n, and 802.16, performance suffers from the presence of a carrier frequency offset. This is due to the fact that the OFDM subcarriers are spaced closely in frequency. Imperfect frequency synchronization causes a loss in subcarrier orthogonality which severely degrades performance.

Referring now to FIG. 1, an OFDM receiver system 10 is shown. Antennas 12-1, 12-2, . . . , and 12-n (referred to collectively as antennas 12) receive signals and pass the signals through low pass filters 14-1, 14-2, . . . , and 14-n (referred to collectively as low pass filters 14). The low pass filters 14 block harmonic emissions which might cause interference with other communications. After being passed through the low pass filters 14, the signals are sent to autocorrelators 16-1, 16-2, . . . , and 16-n (referred to collectively as autocorrelators 16). The autocorrelators 16 find repeating patterns in a signal, such as determining the presence of a periodic signal which has been buried under noise. The signals from the autocorrelators 16 are then combined and sent to a demodulator 18. The demodulator 18 is used to recover the information content from the carrier waves of the signals.

SUMMARY

In general, in one aspect this specification describes an orthogonal frequency-division multiplexing (OFDM) receiver system and method. The method includes: receiving, through a wireless channel, a plurality of modulated signals at a plurality of antennas, wherein each antenna receives a corresponding modulated signal; generating a plurality of autocorrelated signals by autocorrelating the plurality of modulated signals received by the plurality of antennas; determining whether a signal strength associated with each modulated signal received by the plurality of antennas is (i) below a threshold or (ii) above the threshold; for each modulated signal having a signal strength below the threshold, disabling the antenna that received the modulated signal having the signal strength below the threshold; combining the modulated signals having a signal strength above the threshold; generating weighted autocorrelated signals based on (i) the plurality of autocorrelated signals and (ii) the combined modulated signals; generating a combined weighted signal by summing the weighted autocorrelation signals; demodulating the combined weighted signal; and determining a state of the wireless channel based on the demodulation of the combined weighted signal.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
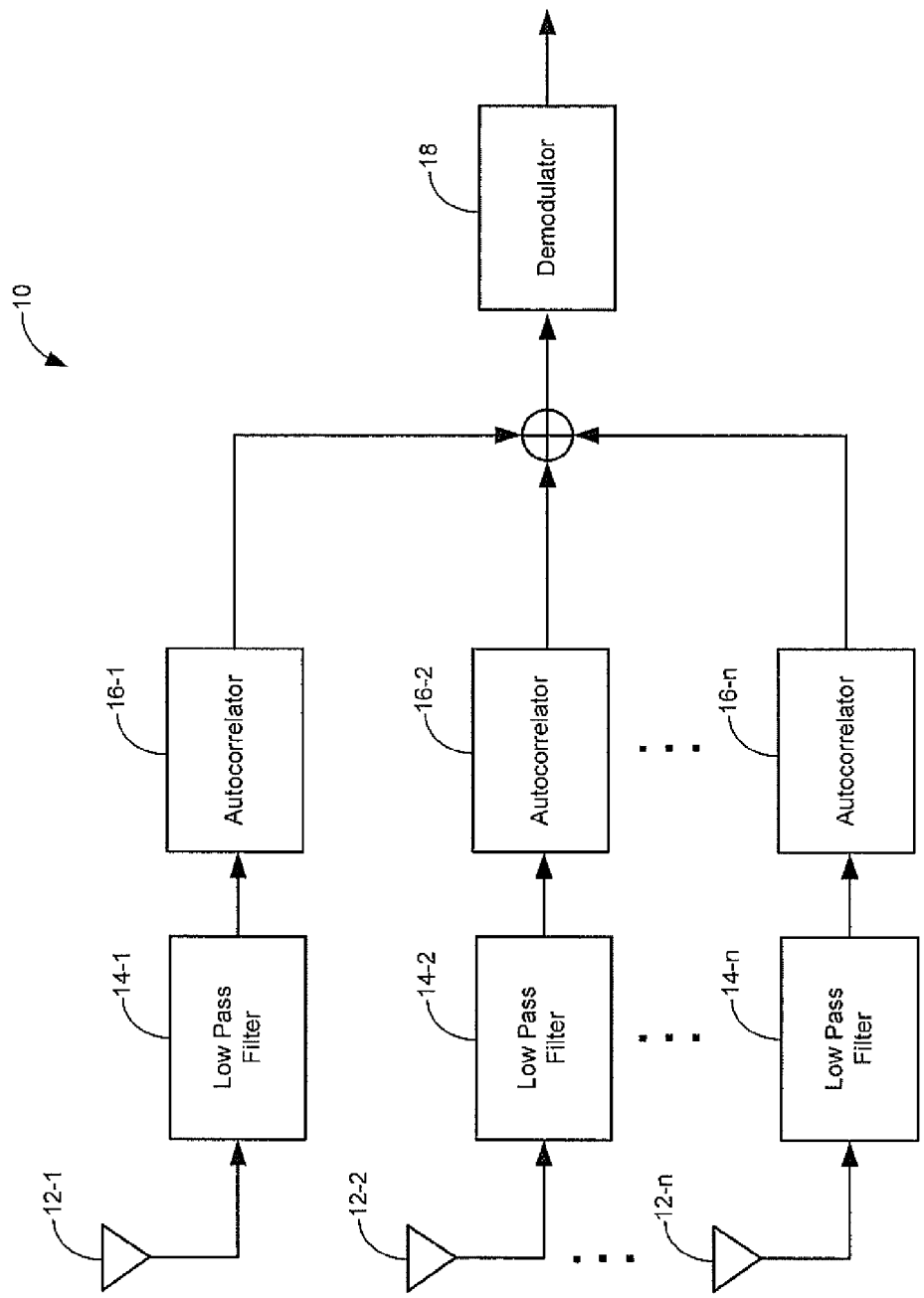
FIG. 1 is a functional block diagram of an OFDM receiver system.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure. While embodiments of the present invention are discussed in terms of OFDM WLAN signals such as those specified by IEEE Standards 802.11a, 802.11g, 802.11n, and 802.16, other embodiments employ other signals, including point-to-point signals as well as network signals.

Figure 2A:
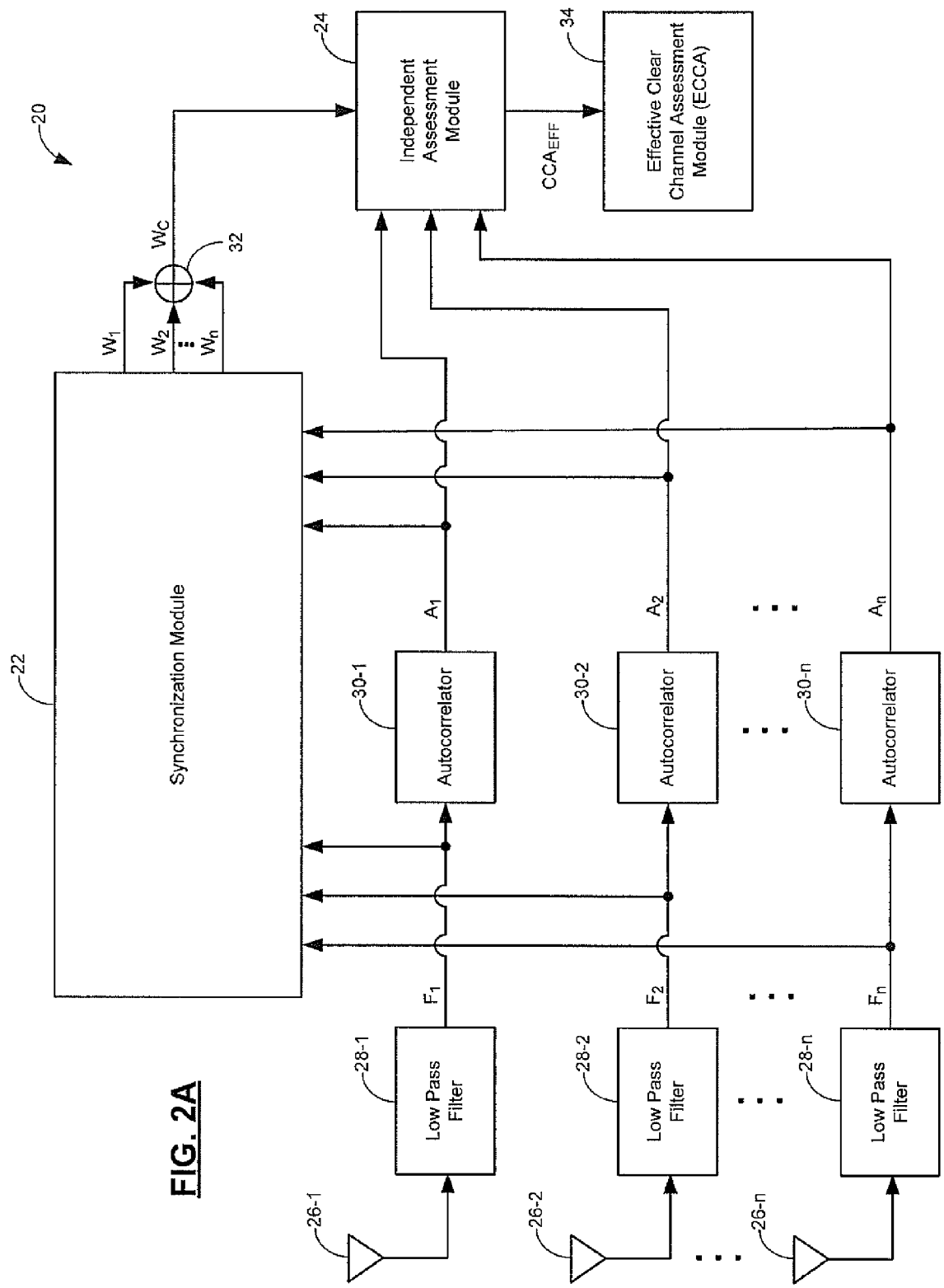
FIG. 2A is a functional block diagram of an OFDM receiver system incorporating a synchronization module and a first embodiment of an independent assessment module.

Referring now to FIG. 2A, an OFDM receiver system 20 incorporating a synchronization module 22 and an independent assessment module 24 (e.g. a carrier sense detect module) is shown. Receiver antennas 26-1, 26-2, . . . , and 26-$n$ (referred to collectively as receive antennas 26) receive signals and pass those signals through low pass filters 28-1, 28-2, . . . , and 28-$n$ (referred to collectively as low pass filters 28). The low pass filters 28 block harmonic emissions which might cause interference with other communications. After being passed through the low pass filters 28, the filtered signals $F_1$, $F_2$, . . . , and $F_n$ are sent to autocorrelators 30-1, 30-2, . . . , and 30-$n$ (referred to collectively as autocorrelators 30) and to the synchronization module 22. The autocorrelators 30 find repeating patterns in a signal. For example, the autocorrelators 30 determine the presence of a periodic signal that has been buried under noise. The autocorrelators 30 then send autocorrelated signals $A_1$, $A_2$, . . . , and $A_n$ to the synchronization module 22 and to the independent assessment module 24.

The synchronization module 22 measures the strength of the signals and combines the signals. The synchronization module 22 outputs weighted autocorrelated signals $W_1$, $W_2$, . . . , and $W_n$. The weighted signals $W_1$, $W_2$, . . . , and $W_n$ are summed using a summing module 32 to form a combined weighted signal $W_C$. The combined weighted signal $W_C$ is then sent to the independent assessment module 24. The independent assessment module 24 demodulates the autocorrelated signals $A_1$, $A_2$, . . . , and $A_n$ and the combined weighted signal $W_C$. The independent assessment module 24 then outputs an effective signal $CCA_{EFF}$. The effective signal $CCA_{EFF}$ is sent to an effective clear channel assessment module 34. The effective clear channel assessment module 34 then determines what action the system is to take based on the effective signal $CCA_{EFF}$.

Figure 2B:
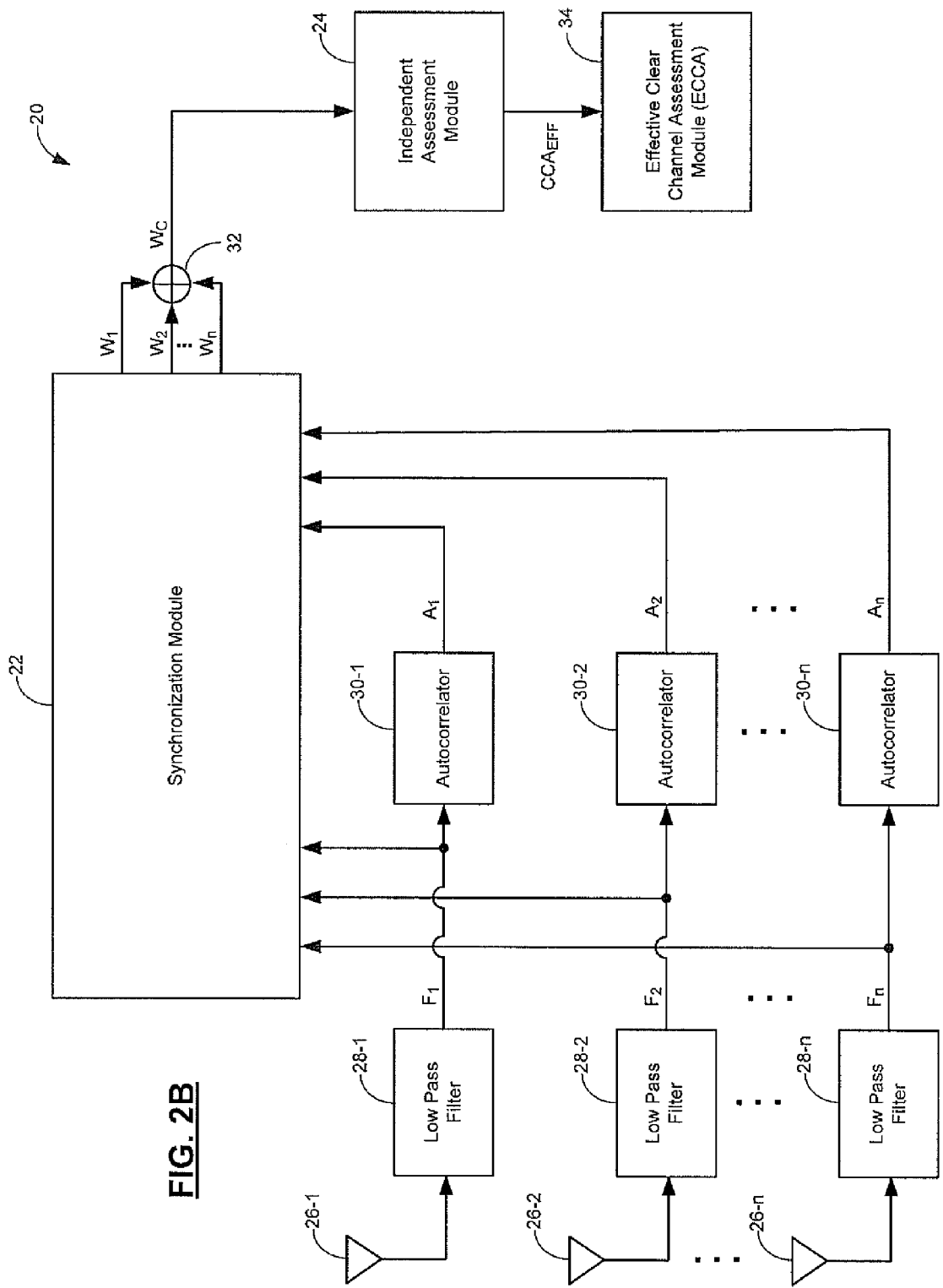
FIG. 2B is a functional block diagram of an OFDM receiver system incorporating a synchronization module and a second embodiment of an independent assessment module.

Referring now to FIG. 2B, the independent assessment module 24 receives the combined weighted signal $W_C$ from the summing module 32. In the present implementation, the independent assessment module 24 does not receive the autocorrelated signals $A_1$, $A_2$, . . . , and $A_n$ from the autocorrelators 30. The independent assessment module 24 demodulates the combined weighted signal $W_C$ and outputs the effective signal $CCA_{EFF}$ accordingly. The effective signal $CCA_{EFF}$ is sent to the effective clear channel assessment module 34. In other words, in the present implementation, the independent assessment module determines the effective signal $CCA_{EFF}$ based only on the combined weighted signal $W_C$.

Figure 3A:
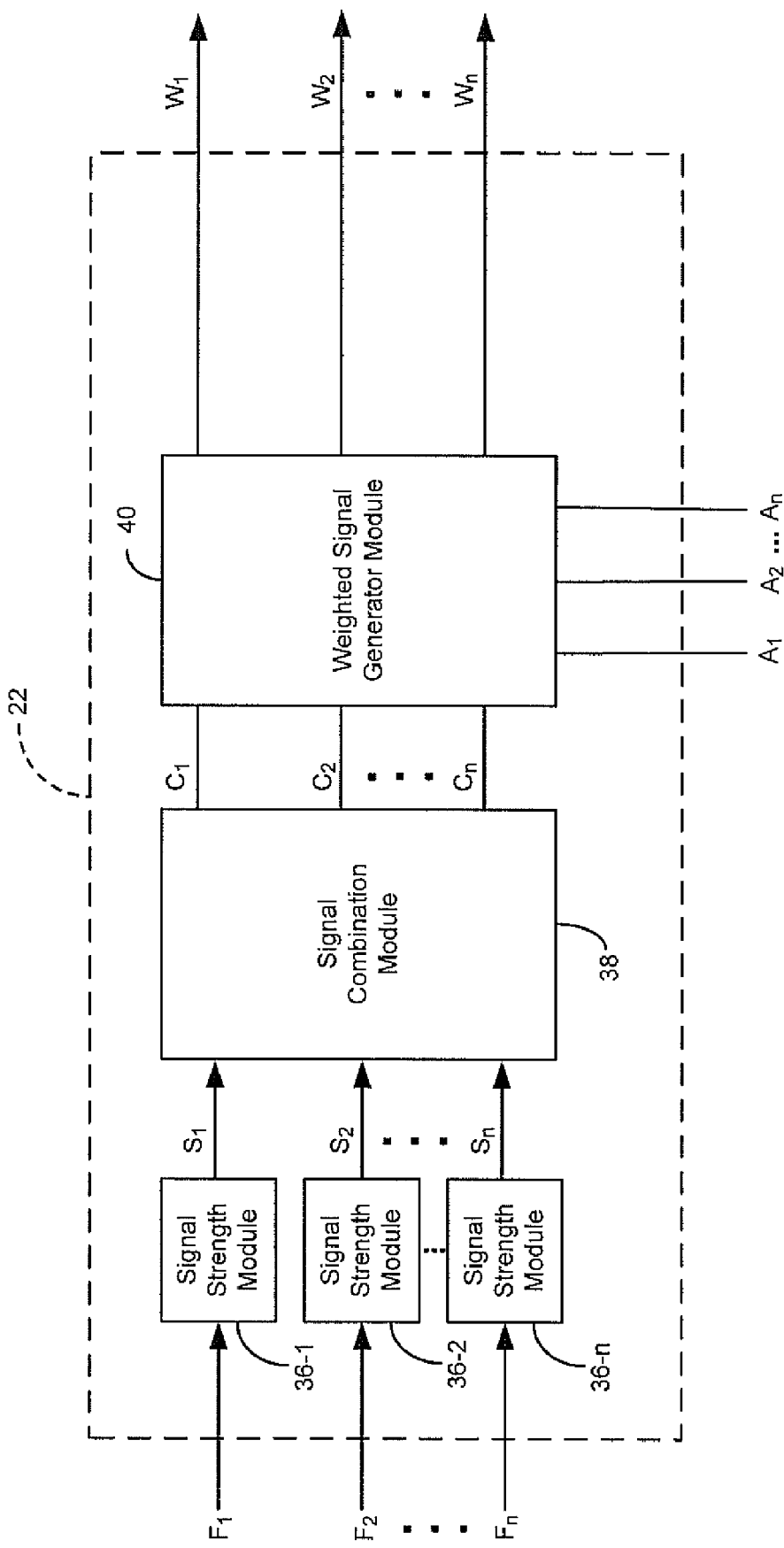
FIG. 3A is a functional block diagram of the synchronization module incorporating signal strength modules, a signal combination module, and a weighted signal generator module.

Referring now to FIG. 3A, a synchronization module 22 incorporating signal strength modules 36-1, 36-2, . . . , and 36-$n$ (referred to collectively as signal strength modules 36), a signal combination module 38, and a weighted signal generator module 40 is shown. Filtered signals $F_1$, $F_2$, . . . , and $F_n$ are passed through the signal strength modules 36. The signal strength modules 36 measure the strength of each signal and output strength signals $S_1$, $S_2$, . . . , and $S_n$. The strength signals $S_1$, $S_2$, . . . , and $S_n$ are sent to the signal combination module 38. The signal combination module 38 combines the signals $S_1$, $S_2$, . . . , and $S_n$. The signal combination module 38 outputs combination signals $C_1$, $C_2$, and $C_n$, which are used, for example, as combining weights. The combination signals $C_1$, $C_2$, . . . , and $C_n$ and the autocorrelated signals $A_1$, $A_2$, . . . , and $A_n$ are sent to the weighted signal generator module 40. The weighted signal generator module 40 generates weighted autocorrelation signals $W_1$, $W_2$, . . . , and $W_n$. The outputs of the weighted signal generator module 40 and the outputs of the synchronization module 22 are the weighted signals $W_1$, $W_2$, . . . , and $W_n$.

Figure 3B:
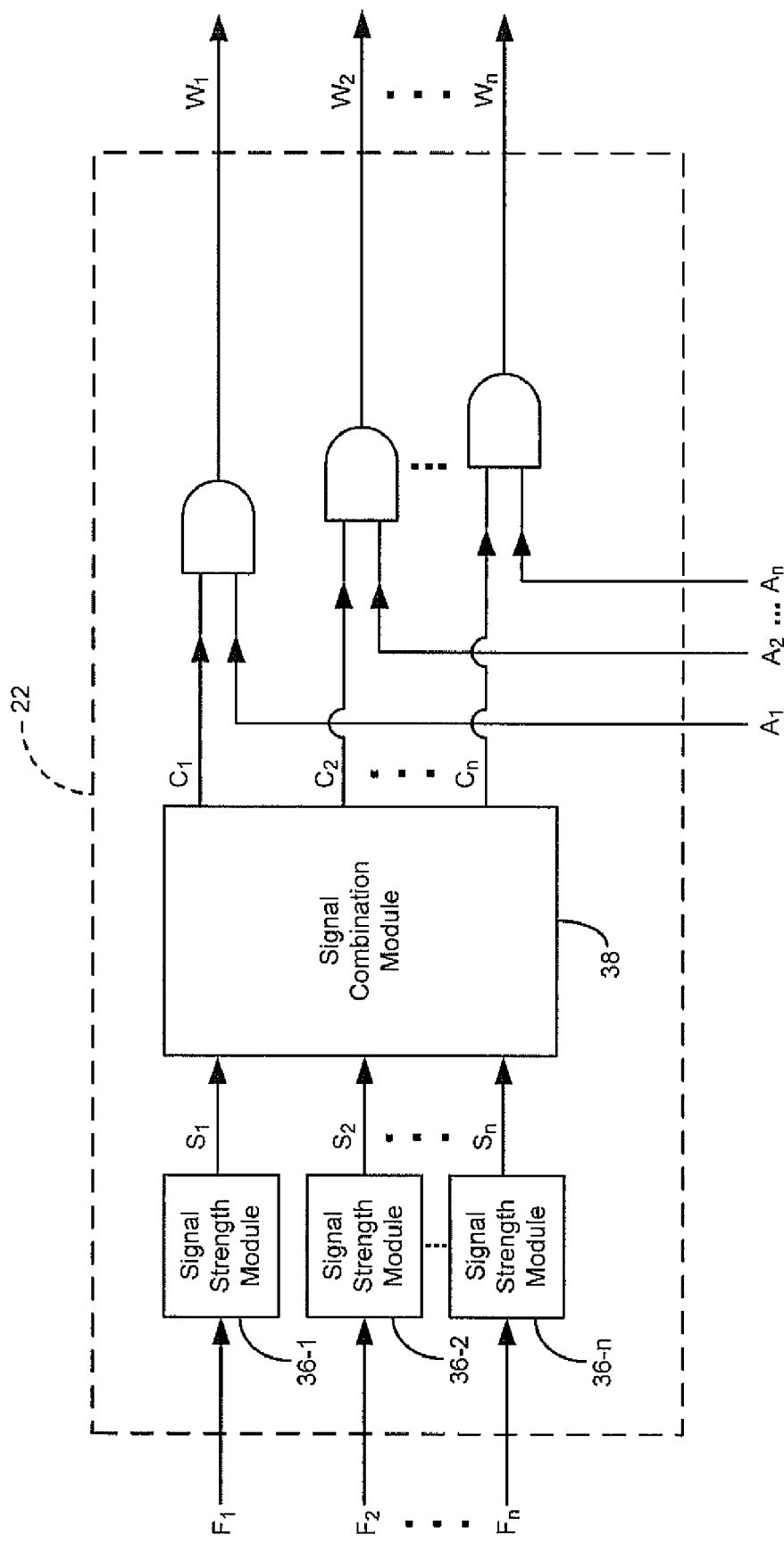
FIG. 3B is a functional block diagram of the synchronization module according to one aspect of the present invention.

Referring now to FIG. 3B, a synchronization module 22 incorporating signal strength modules 36-1, 36-2, . . . , and 36-$n$ (referred to collectively as signal strength modules 36), a signal combination module 38, and a logical AND gates is shown. Filtered signals $F_1$, $F_2$, . . . , and $F_n$ are passed through the signal strength modules 36. The signal strength modules 36 measure the strength of each signal and output strength signals $S_1$, $S_2$, . . . , and $S_n$. The strength signals $S_1$, $S_2$, . . . , and $S_n$ are sent to the signal combination module 38. The signal combination module 38 combines the signals $S_1$, $S_2$, . . . , and $S_n$. The signal combination module 38 outputs combination signals $C_1$, $C_2$, . . . , and $C_n$. The combination signals $C_1$, $C_2$, . . . , and $C_n$ and the autocorrelated signals $A_1$, $A_2$, . . . , and $A_n$ are sent to the logical AND gates. The logical AND gates output weighted autocorrelation signals $W_1$, $W_2$, . . . , and $W_n$. The outputs of the synchronization module 22 are the weighted signals $W_1$, $W_2$, . . . , and $W_n$.

Figure 4:
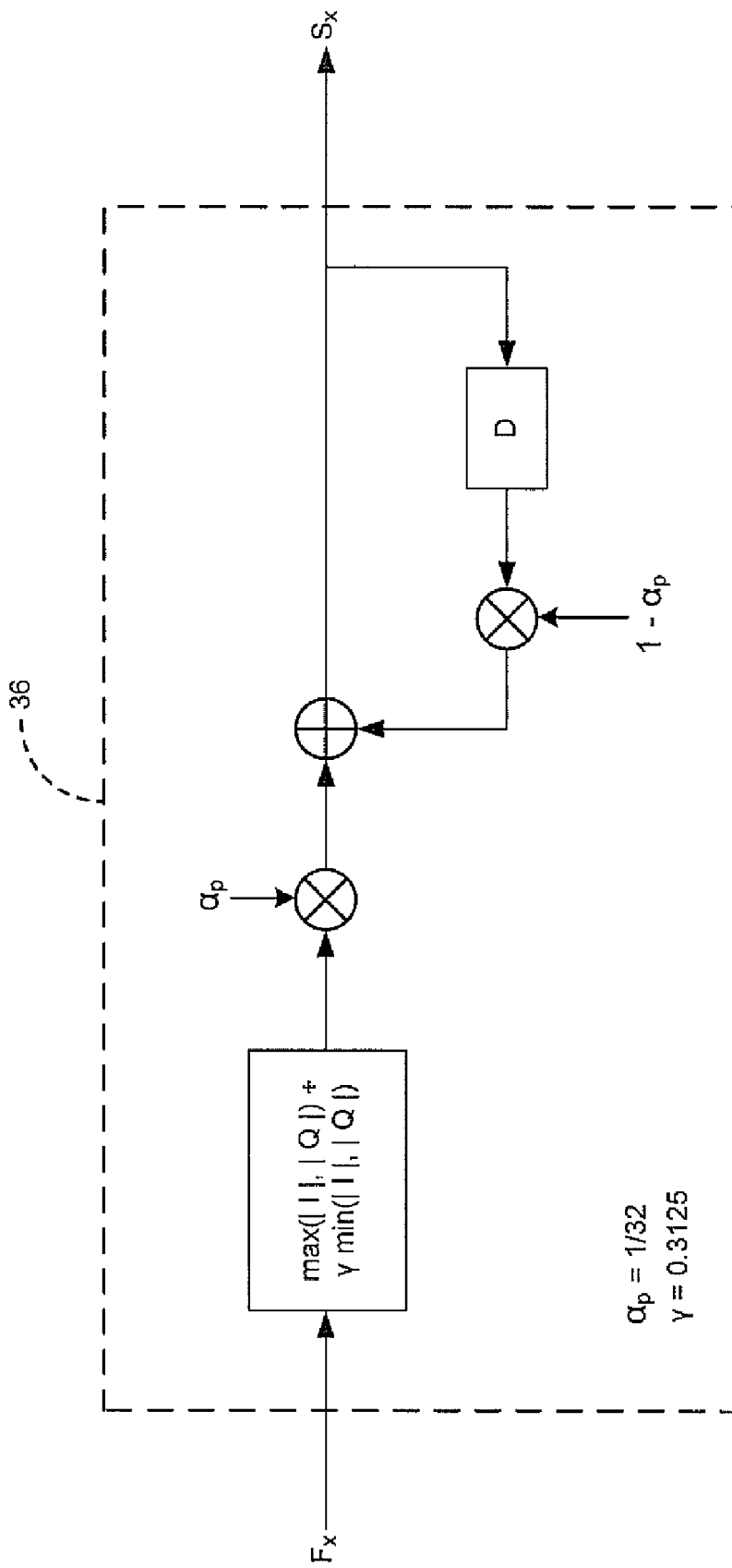
FIG. 4 is a functional block diagram of a signal strength module.

Referring now to FIG. 4, a signal strength module 36 is shown. A filtered signal $F_x$ is input to the signal strength module 36. The power of filtered signal $F_x$ is determined and passed through an error adjustment feedback loop. The error adjustment feedback loop contains a D flip-flop to store a previous power value. The output of the error adjustment feedback loop (i.e. the output of the signal strength module 36) is a strength signal $S_x$. In other words, the signal strength module 36 acts as a low pass filter for filtered signal $F_x$.

Figure 5A:
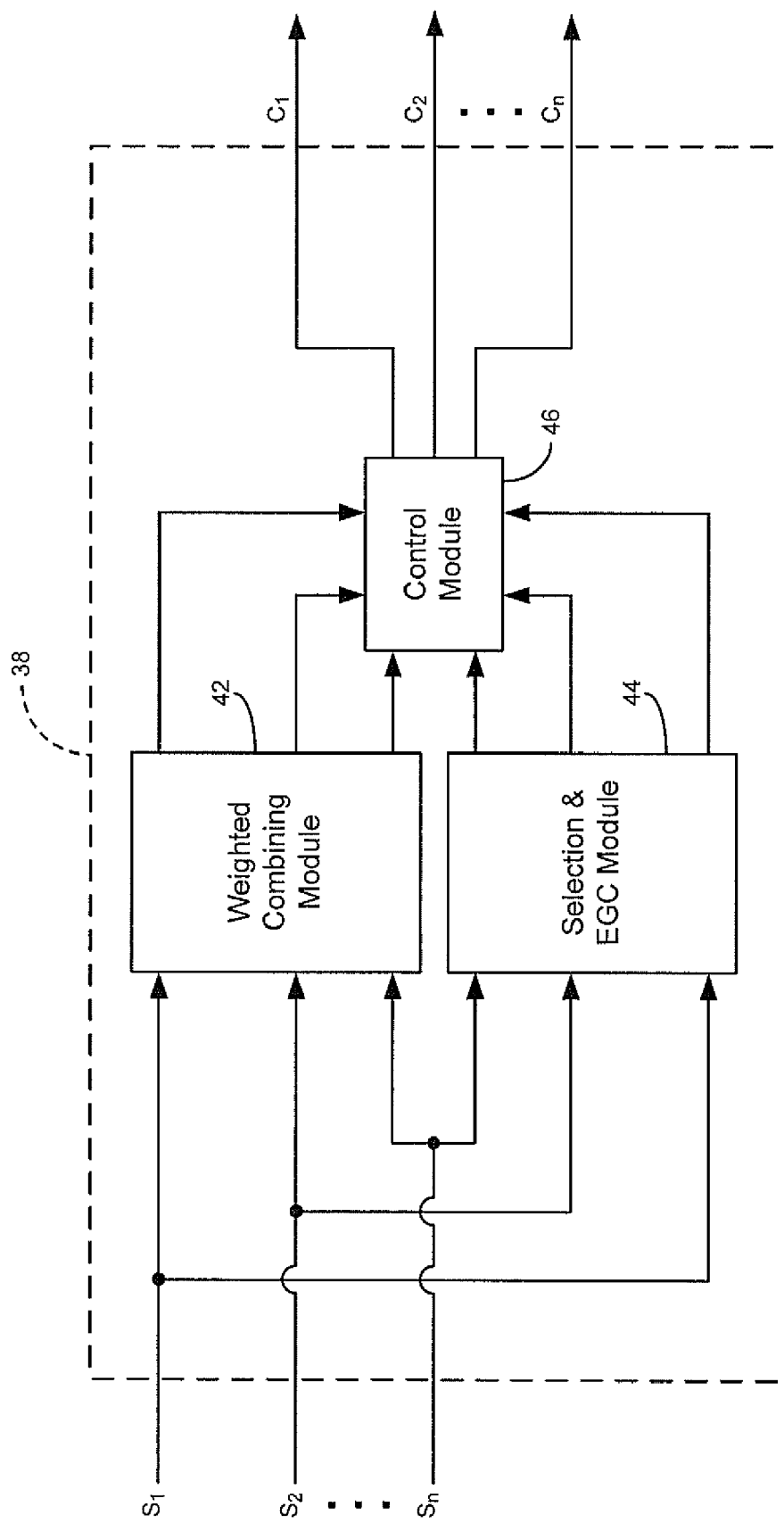
FIG. 5A is a functional block diagram of the signal combination module according to one aspect of the present invention.

Referring now to FIG. 5A, a signal combination module 38 incorporating a weighted combining module 42, a selection and equal gain control (EGC) module 44, and a control module 46 is shown. Strength signals $S_1$, $S_2$, . . . , and $S_n$ are input to the weighted combining module 42 and the selection and EGC module 44. The weighted combining module 42 relates each of the strength signals $S_1$, $S_2$, . . . , and $S_n$ to the maximum value of the strength signals $S_1$, $S_2$, . . . , and $S_n$ to obtain weight signals with values ranging from 0 to 1, where 1 is the maximum weight. The selection and EGC module 44 disables receive antennas 26 (as shown in FIG. 2A) that are in deep fade, and equal gain combines the receive antennas 26 that remain enabled. The receive antennas 26 are in deep fade when the corresponding strength signals $S_1$, $S_2$, . . . , and $S_n$ are below a threshold. Both the weighted combining module 42 and the selection and EGC module 44 output sets of combined signals to the control module 46. The control module 46 outputs combination signals $C_1$, $C_2$, . . . , and $C_n$. The combination signals $C_1$, $C_2$, . . . , and $C_n$ represent the passing of the signals output by either the weighted combining module 42 or the selection and EGC module 44, or a combination of the signals output by both the weighted combining module 42 and the selection and EGC module 44. The combination signals $C_1$, $C_2$, . . . , and $C_n$ are then output by the signal combination module 38.

Figure 5B:
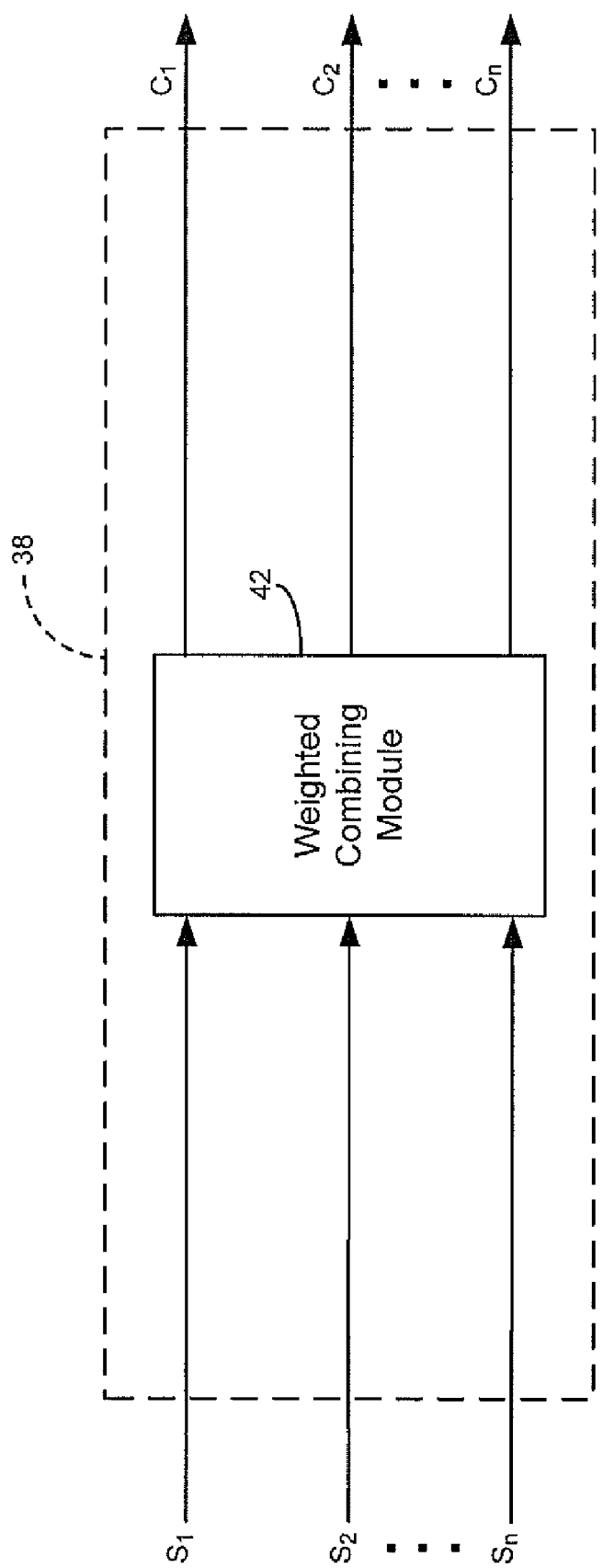
FIG. 5B is a functional block diagram of the signal combination module according to one aspect of the present invention.

Referring now to FIG. 5B, a signal combination module 38 incorporating a weighted combining module 42 is shown. Strength signals $S_1, S_2, \ldots,$ and $S_n$ are input to the weighted combining module 42. The weighted combining module 42 relates each of the strength signals $S_1, S_2, \ldots,$ and $S_n$ to the maximum value of the strength signals $S_1, S_2, \ldots,$ and $S_n$ to obtain weight signals with values ranging from 0 to 1, where 1 is the maximum weight. The weighted combining module 42 outputs the combination signals $C_1, C_2, \ldots,$ and $C_n$, which are then output by the signal combination module 38.

Figure 5C:
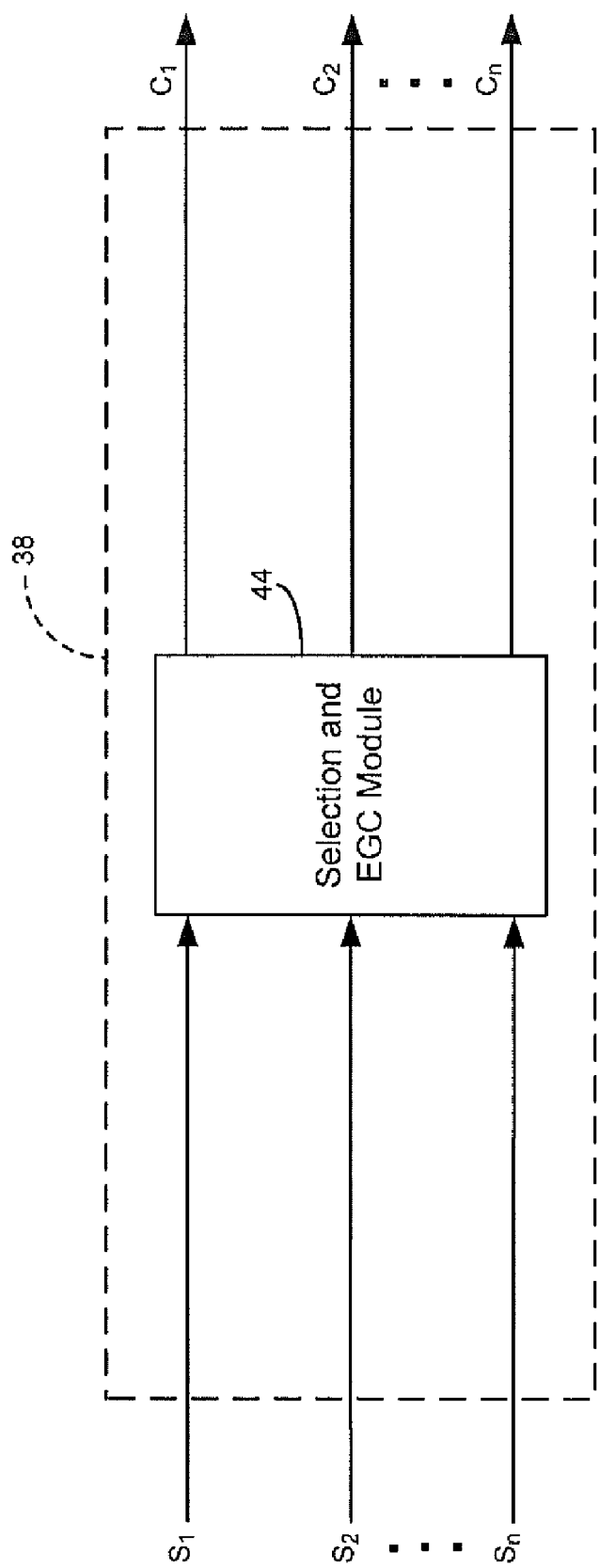
FIG. 5C is a functional block diagram of the signal combination module according to one aspect of the present invention.

Referring now to FIG. 5C, a signal combination module 38 incorporating a selection and EGC module 44 is shown. Strength signals $S_1, S_2, \ldots,$ and $S_n$ are input to the selection and EGC module 44. The selection and EGC module 44 disables receive antennas 26 (as shown in FIG. 2A) that are in deep fade, and equal gain combines the receive antennas 26 that remain enabled. The receive antennas 26 are in deep fade when the corresponding strength signals $S_1, S_2, \ldots,$ and $S_n$ are below a threshold. The selection and EGC module 44 outputs the combination signals $C_1, C_2, \ldots,$ and $C_n$, which are then output by the signal combination module 38.

Figure 6A:
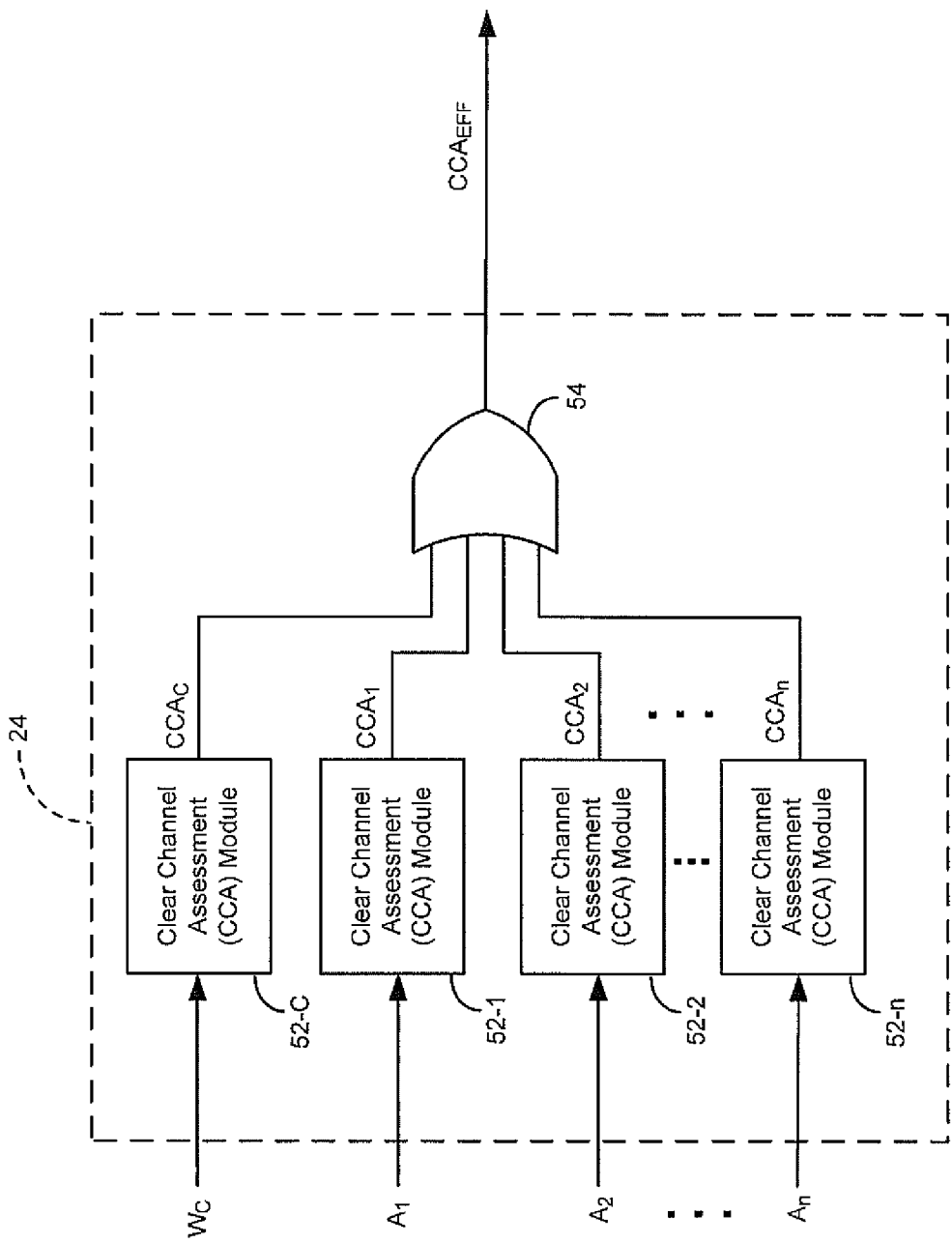
FIG. 6A is a functional diagram of the independent assessment module incorporating multiple clear channel assessment modules.

Referring now to FIG. 6A, an independent assessment module 24 as described in FIG. 2A includes Clear Channel Assessment (CCA) modules 52-1, 52-2, ..., 52-n, and 52-C (referred to collectively as CCA modules 52). A combined weight signal $W_C$ and the autocorrelated signals $A_1, A_2, \ldots,$ and $A_n$ are input to the CCA modules 52, which determine the states of each channel and accordingly allow or defer data transmission. The CCA modules 52 output signals $CCA_1$, $CCA_2$, $CCA_n$ and $CCA_C$. The signals $CCA_1$, $CCA_2$, $CCA_n$ and $CCA_c$ are passed through a logical OR gate 54. The output of the logical OR gate 54 and the independent assessment module 24 is the effective signal $CCA_{EFF}$.

Figure 6B:
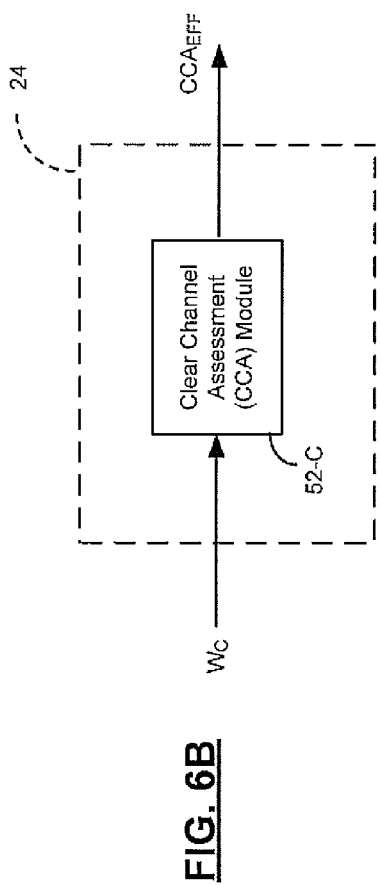
FIG. 6B is a functional diagram of the independent assessment module incorporating a single clear channel assessment module.

Referring now to FIG. 6B, an independent assessment module as described in FIG. 2B includes only the CCA module 52-C. The CCA module 52-C receives the combined weight signal $W_C$, determines the state of a channel, and allows or defers data transmission accordingly.

Figure 7:
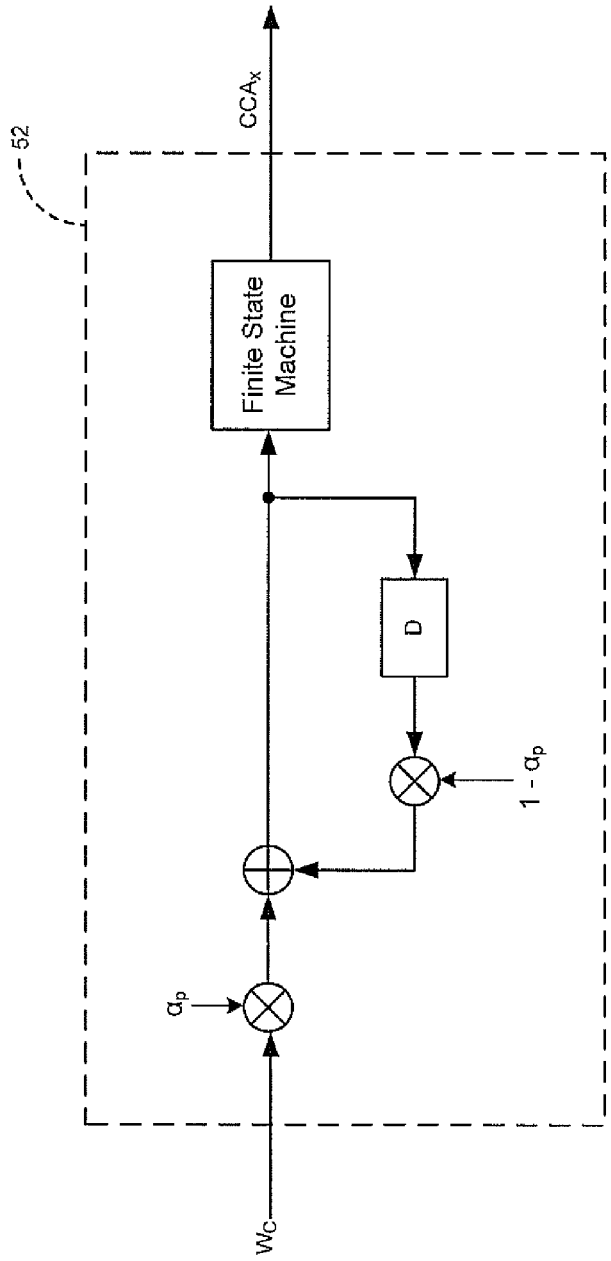
FIG. 7 is a functional block diagram of a clear channel assessment module.

Referring now to FIG. 7, a clear channel assessment (CCA) module 52 is shown. The CCA module determines the state of a channel and accordingly allows or defers data transmission. When the received signal strength is below a specified threshold the channel is declared clear. For example, a media access control (MAC) device (not shown) may receive a channel status signal from the CCA module 52. When the received signal strength is above the threshold, data transmissions are deferred in accordance with the protocol rules.

Figure 8:
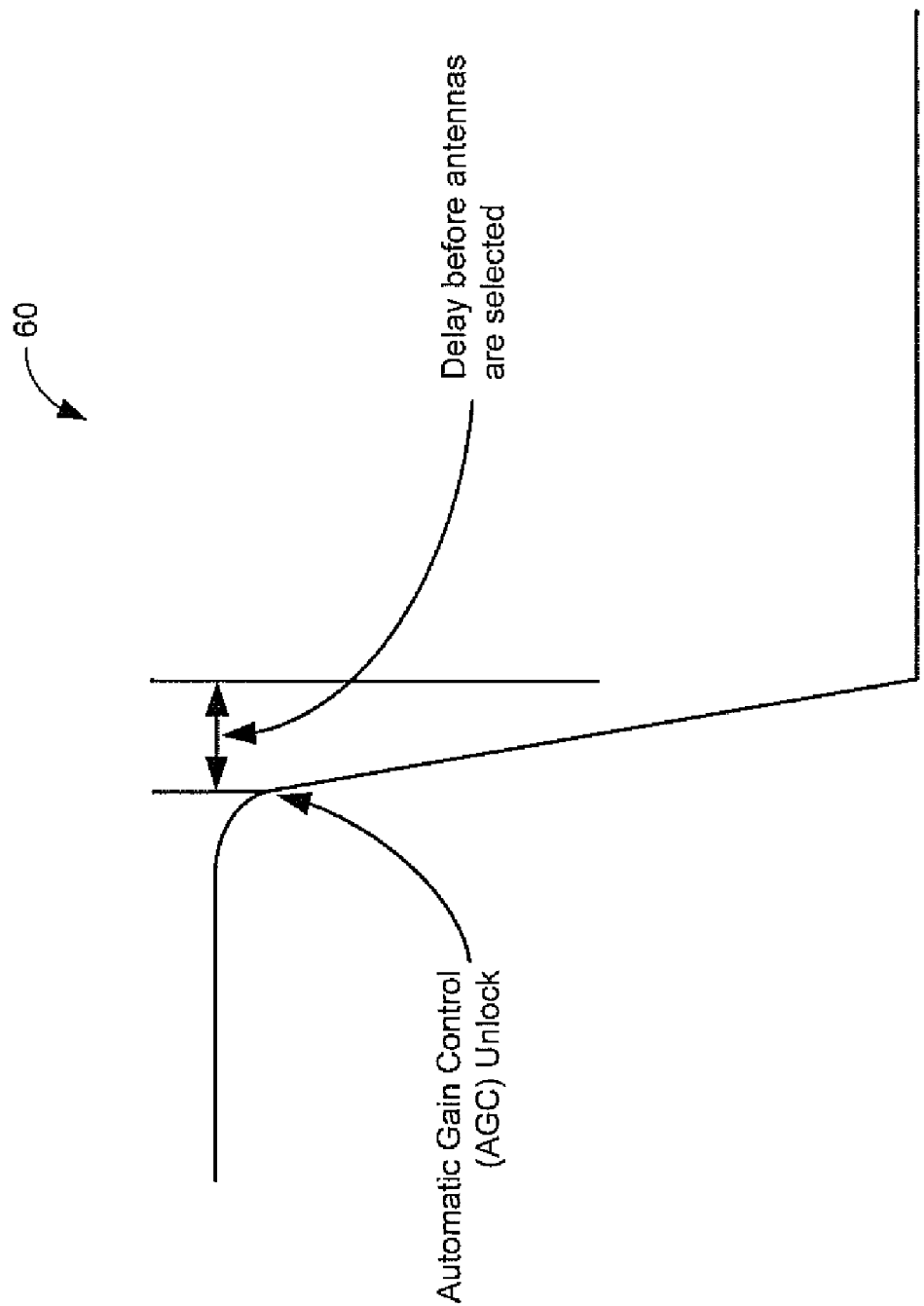
FIG. 8 is a plot illustrating the delay between automatic gain control (AGC) unlock and antenna selection.

Referring now to FIG. 8, a diagram illustrating the delay between automatic gain control (AGC) unlock and antenna selection is shown and is generally designated 60. When AGC unlock occurs, a set period of time must expire before antenna selection can occur. This is required to prevent the selection and EGC module 44 (as shown in FIG. 5) from incorrectly disabling one of the receive antennas 26-1, 26-2, ..., and 26-n (as shown in FIG. 2A). For example, the EGC module 44 may include a timer (not shown) to determine when the set period of time has expired.

Figure 9:
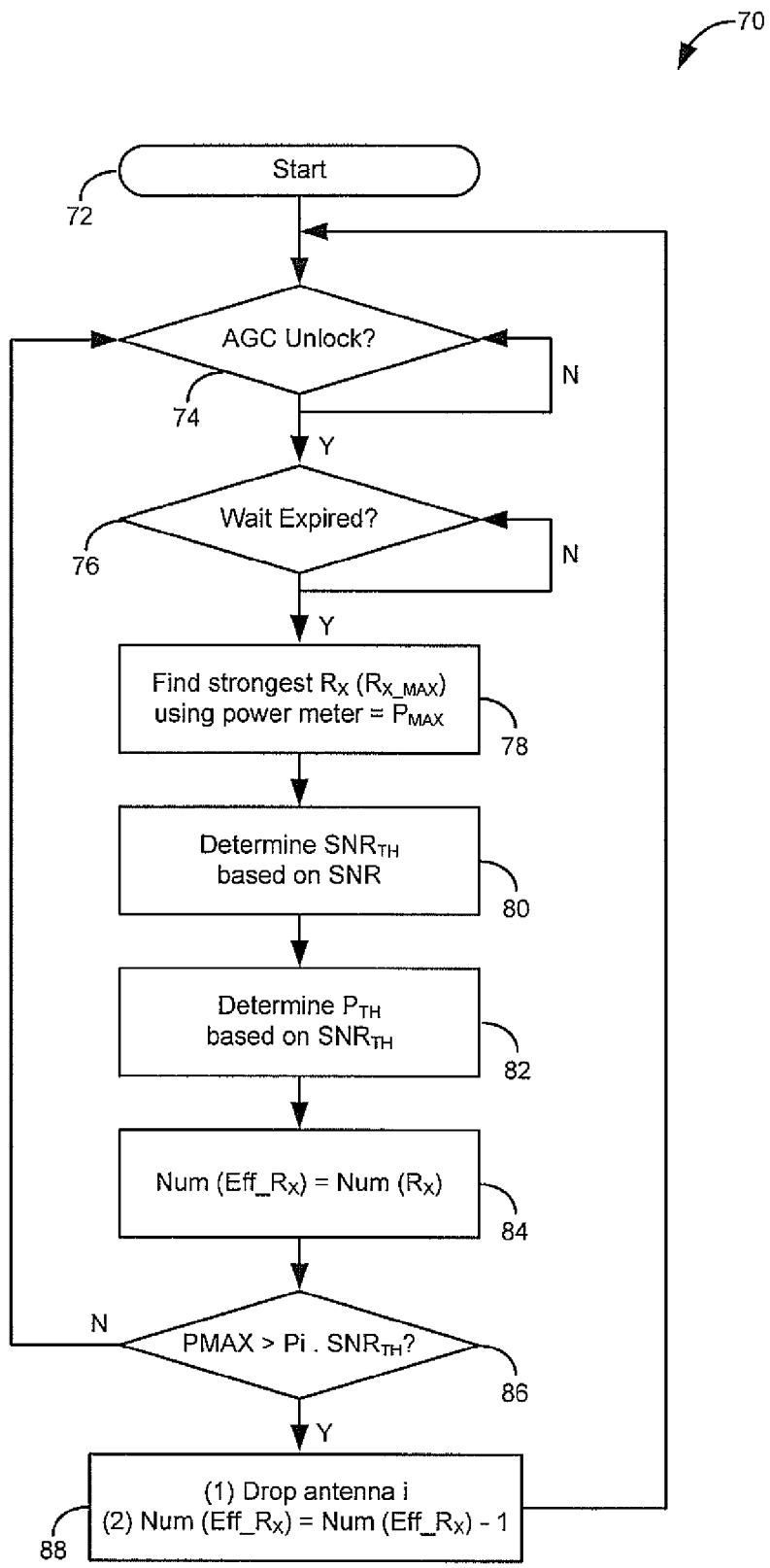
FIG. 9 is a flow chart illustrating the antenna selection process.

Referring now to FIG. 9, steps performed by the selection and EGC module 44 are shown in further detail and are generally designated 70. Control begins with step 72. In step 74, the selection and EGC module 44 determines whether automatic gain control (AGC) is unlocked. If false, control loops back to step 72. If true, control continues with step 76 where it is determined whether the required delay before antenna selection has expired. If false, control loops back to step 74. If true, control continues with step 78 where a strongest antenna is determined using a power meter. Control then proceeds to step 80 where the signal-to-noise ratio threshold ($SNR_{TH}$) is determined using the signal-to-noise ratio (SNR). Control then proceeds to step 82 where the power threshold ($P_{TH}$) is determined using the signal-to-noise threshold ($SNR_{TH}$). Control then proceeds to step 84 where the number of effective antennas is set to the number of receive antennas used. Control then proceeds to step 86 where it is determined whether the maximum power is greater than the power of the current antenna. If false, control loops back to step 74. If true, control continues with step 88 where the current antenna is disabled and the number of effective antennas is reduced by one. Control then loops back to step 74.

Referring now to FIGS. 10A-10E, various exemplary implementations of the OFDM receiver system are shown.

Figure 10A:
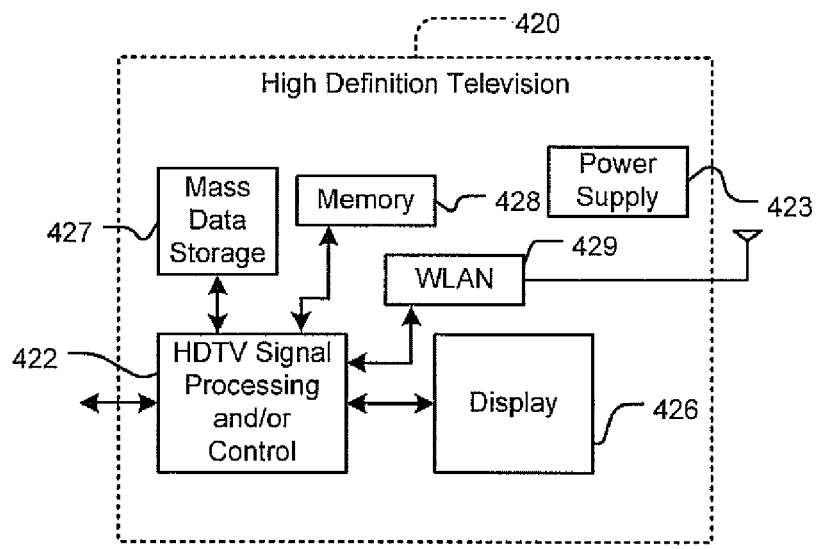
FIG. 10A is a functional block diagram of a high definition television.

Referring now to FIG. 10A, the OFDM receiver system can be implemented in a high definition television (HDTV) 420. For example, the OFDM receiver system could be implemented in a WLAN interface of the HDTV 422. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices for example hard disk drives HDD and/or DVDs. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Figure 10B:
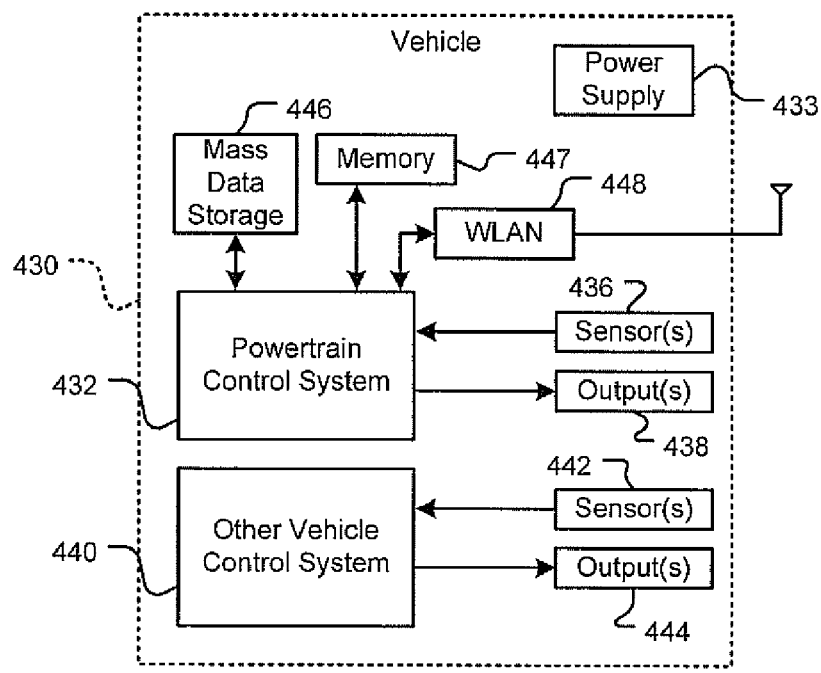
FIG. 10B is a functional block diagram of a vehicle control system.

Referring now to FIG. 10B, the OFDM receiver system may implement and/or be implemented in a WLAN interface of a vehicle 430. In some implementations, the OFDM receiver system implement a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The OFDM receiver system may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives HDD and/or DVDs. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 10C:
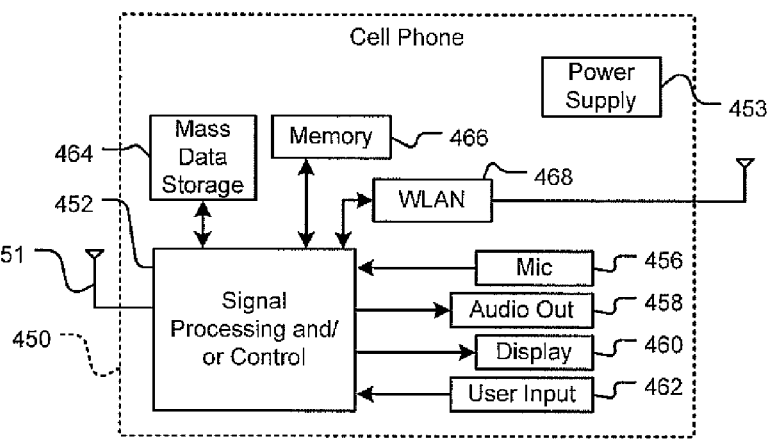
FIG. 10C is a functional block diagram of a cellular phone.

Referring now to FIG. 10C, the OFDM receiver system can be implemented in a cellular phone 450 that may include a cellular antenna 451. For example, the OFDM receiver system could be implemented in a WLAN interface of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 10D:
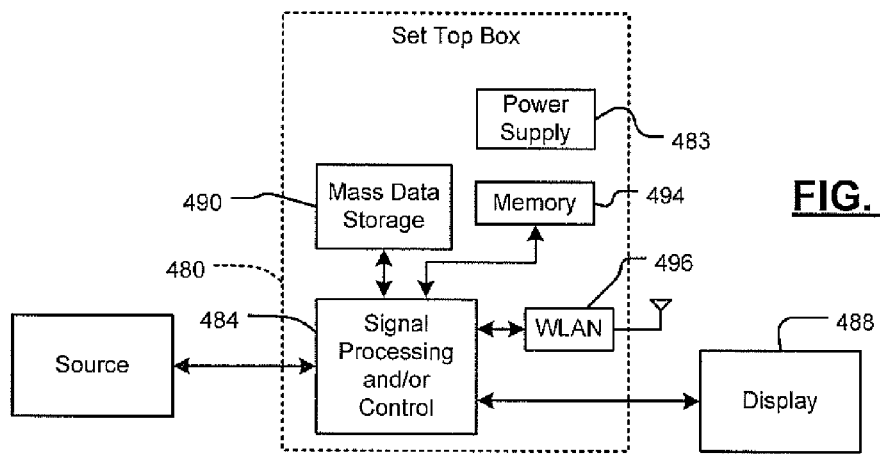
FIG. 10D is a functional block diagram of a set top box.

Referring now to FIG. 10D, the OFDM receiver system can be implemented in a set top box 480. For example, the OFDM receiver system could be implemented in a WLAN interface of the set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 10E:
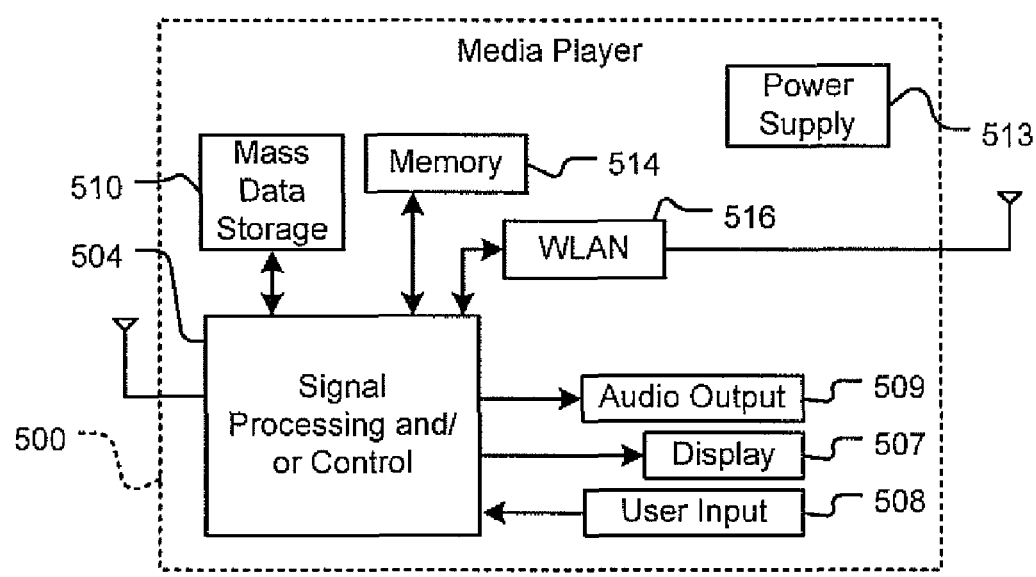
FIG. 10E is a functional block diagram of a media player.

Referring now to FIG. 10E, the OFDM receiver system can be implemented in a media player 500. For example, the OFDM receiver system could be implemented in a WLAN interface of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. An orthogonal frequency-division multiplexing (OFDM) receiver system comprising:
   a plurality of antennas configured to receive a plurality of modulated signals, wherein each antenna is configured to receive a corresponding modulated signal;
   a plurality of autocorrelators configured to generate a plurality of autocorrelated signals by autocorrelating the plurality of modulated signals received by the plurality of antennas;
   a first module configured to determine whether a signal strength associated with each modulated signal received by the plurality of antennas is (i) below a threshold or (ii) above the threshold;
   a second module configured to
      for each modulated signal having a signal strength below the threshold, disable the antenna that received the modulated signal having the signal strength below the threshold, and
      combine the modulated signals having a signal strength above the threshold;
   a third module configured to generate weighted autocorrelated signals based on (i) the plurality of autocorrelated signals and (ii) the modulated signals combined by the second module;
   a fourth module configured to generate a combined weighted signal by summing the weighted autocorrelation signals; and
   a fifth module configured to demodulate the combined weighted signal generated by the fourth module.

2. The OFDM receiver system of claim 1, further comprising a sixth module configured to determine a state of a wireless channel through which the modulated signals were received based on the demodulation of the combined weighted signal generated by the fourth module.

3. The OFDM receiver system of claim 2, wherein in response to the state of the wireless channel being clear, the sixth module is configured to generate a signal indicating that the wireless channel is clear.

4. The OFDM receiver system of claim 3, further comprising a media access control configured to receive the signal indicating that the wireless channel is clear.

5. The OFDM receiver system of claim 1, wherein the OFDM receiver system is compliant with an IEEE standard.

6. The OFDM receiver system of claim 1, wherein the IEEE standard comprises one or more of 802.11a, 802.11g, 802.11n, or 802.16.

7. A high definition television comprising the OFDM receiver system of claim 1.

8. A vehicle control system comprising the OFDM receiver system of claim 1.

9. A cellular phone comprising the OFDM receiver system of claim 1.

10. A set top box comprising the OFDM receiver system of claim 1.

11. A cellular phone comprising the OFDM receiver system of claim 1.

12. A method comprising:

receiving, through a wireless channel, a plurality of modulated signals at a plurality of antennas, wherein each antenna receives a corresponding modulated signal;

generating a plurality of autocorrelated signals by autocorrelating the plurality of modulated signals received by the plurality of antennas;

determining whether a signal strength associated with each modulated signal received by the plurality of antennas is (i) below a threshold or (ii) above the threshold;

for each modulated signal having a signal strength below the threshold, disabling the antenna that received the modulated signal having the signal strength below the threshold;

combining the modulated signals having a signal strength above the threshold;

generating weighted autocorrelated signals based on (i) the plurality of autocorrelated signals and (ii) the combined modulated signals;

generating a combined weighted signal by summing the weighted autocorrelation signals;

demodulating the combined weighted signal; and determining a state of the wireless channel based on the demodulation of the combined weighted signal.

* * * * *